United States Patent [19]

Abe et al.

[11] Patent Number: 5,396,487
[45] Date of Patent: Mar. 7, 1995

[54] STRUCTURE FOR HOLDING AN OPTICAL ARTICLE

[75] Inventors: Tetsuya Abe; Yasunori Arai; Seiichi Sasaki, all of Tokyo, Japan

[73] Assignee: Asahi Kogaku Kogyo Kabushiki Kaisha, Tokyo, Japan

[21] Appl. No.: 785,160

[22] Filed: Oct. 31, 1991

Related U.S. Application Data

[63] Continuation of Ser. No. 580,467, Sep. 11, 1990, abandoned.

[30] Foreign Application Priority Data

Sep. 19, 1989 [JP] Japan ................................. 1-244377
Jul. 16, 1990 [JP] Japan ................................. 2-188487

[51] Int. Cl.⁶ .............................................. G02B 7/02
[52] U.S. Cl. .................................... 359/819; 359/808; 359/811
[58] Field of Search .......................... 350/245–247, 350/252, 255, 257, 429; 354/195.1; 359/800–830, 896

[56] References Cited

U.S. PATENT DOCUMENTS

| 3,819,254 | 6/1974 | Hummel et al. | 359/826 |
|---|---|---|---|
| 4,252,411 | 2/1981 | Nomura | 350/255 |
| 4,387,968 | 6/1983 | Sekiguchi | 350/429 |
| 4,408,830 | 11/1983 | Wutherich | 359/819 |
| 4,560,237 | 12/1985 | Ohkura et al. | 350/255 |
| 4,610,517 | 9/1986 | Fukino et al. | 350/257 |
| 4,627,691 | 12/1986 | Tomori | 350/429 |
| 4,690,505 | 9/1987 | Iizuka et al. | 359/829 |
| 4,712,871 | 12/1987 | Tanii et al. | 359/827 |
| 4,725,126 | 2/1988 | Siga et al. | 350/252 |
| 4,764,783 | 8/1988 | Tanaka | 350/255 |
| 4,778,253 | 10/1988 | Siga et al. | 350/252 |
| 4,812,015 | 3/1989 | Iizuka et al. | 350/255 |
| 4,854,671 | 8/1989 | Hanke et al. | 350/252 |
| 4,861,137 | 8/1989 | Nagata | 359/820 |
| 4,861,139 | 8/1989 | Andou et al. | 350/252 |
| 4,962,399 | 10/1990 | Numako et al. | 354/195.1 |
| 5,053,794 | 10/1991 | Benz | 359/830 |

FOREIGN PATENT DOCUMENTS

| 2922287 | 12/1980 | Germany | 350/252 |
|---|---|---|---|
| 58-184921 | 10/1983 | Japan | 350/252 |
| 135406 | 8/1984 | Japan | 359/823 |
| 195206 | 11/1984 | Japan | 359/808 |
| 5215 | 1/1986 | Japan | 359/819 |
| 84615 | 4/1986 | Japan | 359/819 |
| 61-275709 | 12/1986 | Japan | 350/245 |
| 11816 | 1/1987 | Japan | 359/811 |
| 62-244007 | 10/1987 | Japan | 350/252 |
| 66506 | 3/1990 | Japan | 359/819 |
| 127934 | 8/1992 | Japan | 359/811 |

Primary Examiner—Scott J. Sugarman
Assistant Examiner—Thong Nguyen
Attorney, Agent, or Firm—Sandler Greenblum & Bernstein

[57] ABSTRACT

An optical holder for use in optical equipment, such as an astronomical telescope. The optical holder includes a barrel which has an inner peripheral wall. At least one optical article having an outer peripheral surface, such as a lens or a mirror, is mounted within the barrel. The inner peripheral wall of the barrel and the outer peripheral surface of the optical article are so sized as to provide a gap therebetween. The structure further includes a spacer, or spacers, that fit in the gap to hold the optical article in place. An annular spacer may be used or a plurality of spacers may be fit between the inner wall of the barrel and the optical article in a circumferentially spaced relationship. A shifting screw may also be used to shift the optical article within the barrel.

5 Claims, 4 Drawing Sheets

5,396,487

STRUCTURE FOR HOLDING AN OPTICAL ARTICLE

This application is a continuation of application number 07/580,467, filed Sep. 11, 1990, now abandoned.

BACKGROUND OF THE INVENTION

1. Field of the Invention

The present invention relates to a structure for holding an optical article, such as a lens and the like.

2. Description of the Related Art

In a conventional optical equipment, a holding frame or barrel is often used to hold an optical article such as a lens or a mirror. Such optical equipment usually requires a precise alignment of the optical axis of the optical article with respect to the center axis of the barrel. This is often very important, especially when the optical article is a lens. For the alignment, the barrel may have an inner peripheral surface of a shape that corresponds to that of an outer peripheral surface of the optical article. For example, when the article has an outer peripheral surface of a circular shape, the inner surface of the barrel may have an inner surface of a circular shape with a nearly equal diameter. However, the diameter of the former should be smaller than that of the latter if they are not interference-fit to each other. Therefore, in many cases, the barrel and the optical article are so sized as to provide either a small gap or a large gap therebetween.

In the former, with a small gap, it is easy to align the center of the optical article with the center of the barrel. However, the inner peripheral wall of the barrel and the outer peripheral surface of the optical article must be accurately finished or processed. Such a process results in an increased production cost. A further disadvantage of this arrangement is that edge chips, scratches or other undesirable flaws are likely to occur as a result a of contact of the optical article with the barrel, due to such a small gap.

In the latter, with a large gap, when a part of the outer peripheral surface of the optical article is in contact with the inner peripheral wall of the barrel, the center of the optical article is offset from the center of the barrel, which adversely affects the performance of an optical equipment. Thus, it is difficult to align the center of the optical article with the center of the barrel while holding the optical article, without using a retainer or screw to hold the optical article. However, such a retainer or screw is likely to loosen over a long period of time. This causes the optical article to be inconveniently offset from the barrel.

SUMMARY OF THE INVENTION

Accordingly, it is an object of the present invention to provide a structure for holding an optical article, which can properly align an optical article with a barrel without the occurrence of edge chips or other undesirable flaws during insertion.

It is another object of the present invention to provide a structure for holding an optical article, which prevents an optical article from being offset from a barrel during use and thus maintains the optical performance of an optical equipment, and which makes it possible to reduce the production cost of the optical equipment.

In accordance with the present invention, there is provided a structure for holding an optical article, which includes a holding frame or barrel for receiving an optical article. The barrel has an inner peripheral wall. The optical article has an outer peripheral surface. The inner peripheral wall of the barrel and the outer peripheral surface of the optical article are so sized as to provide a gap therebetween. The structure further includes a spacer which is fitted in the gap to hold the optical article in place. The use of the spacer makes it possible to finish both the inner peripheral surface of the barrel and the outer peripheral surface of the optical article with a greater tolerance than is possible with conventional equipment and consequently, reduce the production cost of the overall optical equipment.

BRIEF DESCRIPTION OF THE DRAWINGS

A better understanding of the present invention may be had by reference to the following description of preferred embodiments when taken in conjunction with the accompanying drawings, in which.

DESCRIPTION OF THE PREFERRED EMBODIMENTS

Figure 1:
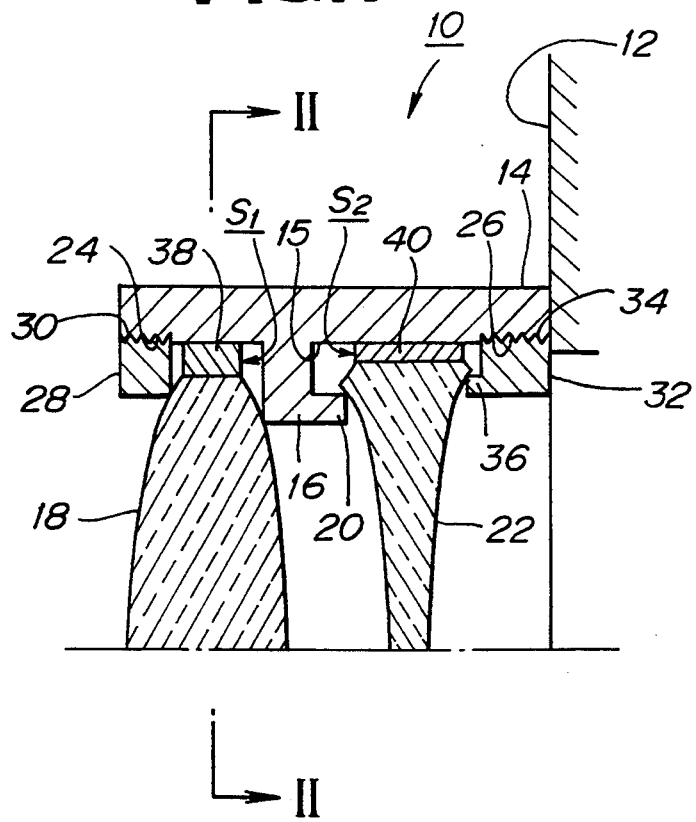
FIG. 1 is a fragmentary sectional view of an optical holder according to one embodiment of the present invention, in which a lower half of the optical holder is cut away for simplicity.
Figure 2:
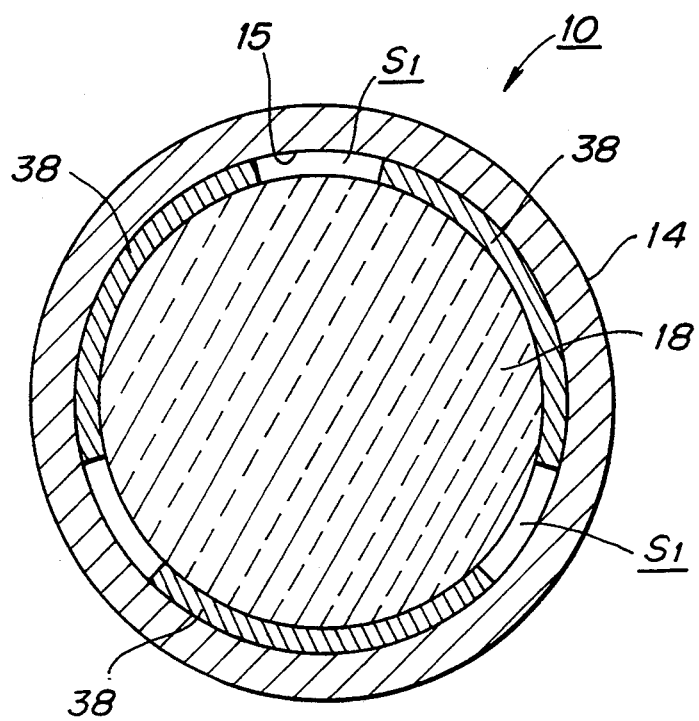
FIG. 2 is a sectional view taken along line II—II of FIG. 1.

With reference to FIGS. 1 and 2, there is shown an optical holder 10 made according to the present invention. The optical holder 10 is attached to body 12 of a suitable optical equipment, such as an astronomical telescope. It should be understood that the optical holder 10 may be integral with the body 12. The optical holder 10 includes a generally cylindrical member or barrel 14 which has a substantially cylindrical or circular inner wall 15. The barrel 14 has an integral intermediate flange 16 on the inner wall 15, the outer side (left-hand side in the drawing) of which is in engagement with one side of a convex lens 18 that has a circular outer peripheral surface. Alternatively, the barrel 14 may include a separate flange. An annular projection 20 extends from the inner side of the flange 16 and engages with one side of a concave lens 22 having a circular outer peripheral surface. The barrel 14 also has opposite internal threads 24 and 26 at its inner wall 15. An outer ring 28 has external threads 30 for threaded engagement with the internal threads 24 of the barrel 14 and engages with the other side of the convex lens 18. Likewise, an inner ring 32 has external threads 34 for threaded engagement with the internal threads 26 of the barrel 14. An annular projection 36 extends from one side of the inner ring 32 and engages with the other side of the concave lens 22.

As best seen in FIG. 2, the diameter of the inner wall 15 is greater than the outer diameter of the convex lens 18, so as to provide an annular space $S_1$ therebetween, when the convex lens 18 is mounted in alignment with the barrel 14. In the illustrated embodiment, three arcuate spacers 38 are inserted into the space $S_1$ in a circumferentially spaced relationship to hold the convex lens 18 in place. Likewise, the diameter of the inner wall 15 is greater than the outer diameter of the concave lens 22 so as to provide an annular space $S_2$ therebetween when the concave lens 22 is mounted in alignment with the barrel 14. Three arcuate spacers 40 are inserted into the space $S_2$ in a circumferentially spaced relationship to hold the concave lens 22 in place. The spacers 38 and 40 are preferably made of a rubber-like, compressible or resilient material, such as for instance, a polyvinyl chloride. Each of the spacers 38, 40 has such a uniform thickness as to fit between the inner wall 15 and the lens 18 or 22.

In assembly, the concave lens 22 is placed within the inner wall 15 with its outer side engaged with the annular projection 20 of the flange 16, as well as with the space $S_2$ left between its outer peripheral surface and the inner wall 15. The three spacers 40 are inserted into the space $S_2$ at circumferentially spaced intervals. The external threads 34 of the inner ring 32 are then threadably engaged with the internal threads 26 of the inner wall 15. This brings the annular projection 36 of the inner ring 32 into engagement with the concave lens 22. The convex lens 18 is held in place within the barrel 14 in the same manner, and thus no details will be given herein. Alternatively, the lenses 18 and 22 may be inserted after the spacers have been placed within the barrel 14.

In the illustrated embodiment, the barrel 14 and the lenses 18, 22 are so sized as to provide annular gaps large enough to prevent chippage or other undesirable flaws as a result of contact of the both components upon insertion. The spacers 38, 40 facilitate alignment of the lenses 18, 22 with respect to the inner wall 15 without the need to use adjusting screws, and prevent the lenses 18, 22 from being offset from the inner wall 15 of the barrel 14. A high performance lens system can therefore be obtained.

The foregoing arrangement is also useful in the following instances:

(a) It is useful in the case where lenses of different diameters are to be each held within corresponding barrels of identical design and size. Typically, lenses of different magnifications may be mounted within different barrels of identical design, so as to provide, for example, telescopes of different magnifications. By using a spacer of thickness corresponding to the diameter of any selected lens, the barrels of the same design can be commonly used among telescopes of different magnifications. The costs of manufacturing telescopes can thus be lowered.

(b) It is also useful in the case where a plurality of lenses of different diameters are to be held within a single barrel having a single cylindrical inner wall. Specifically, the barrel of FIG. 1 may include a separate axial spacer, in lieu of the integral flange 16, while the outer peripheral surfaces of the spacers 38 and 40 are in contact with the cylindrical inner wall. It will be appreciated that the thickness of each spacer depends on the diameter of the associated lens. This arrangement eliminates the need for providing individual cylindrical inner walls of different diameters corresponding to the diameters of the associated lenses, and thus, reduces the production cost of the whole structure. This particular arrangement is suitable when the lenses need not be precisely positioned in its axial direction by a fixed flange such as flange 16.

(c) It is useful when a tolerance of the inner diameter of the barrel and/or a tolerance of the diameter of the lens are relatively large. In this case, i) a selection may be made, from a lot of spacers of different thicknesses, of such a spacer that has a thickness corresponding to the actual gap between the barrel and the lens to be held, or ii) such a spacer may be used, that is made of a compressible or resilient material, that has a thickness greater than the maximum possible gap, and could be compressed to reduce its thickness to the minimum possible gap, so that it may be absorb the relatively large variation of the gap between the barrel and the lens. In this way, the spacer can be manufactured with a greater tolerance and thus at a lowered cost.

Figure 3:
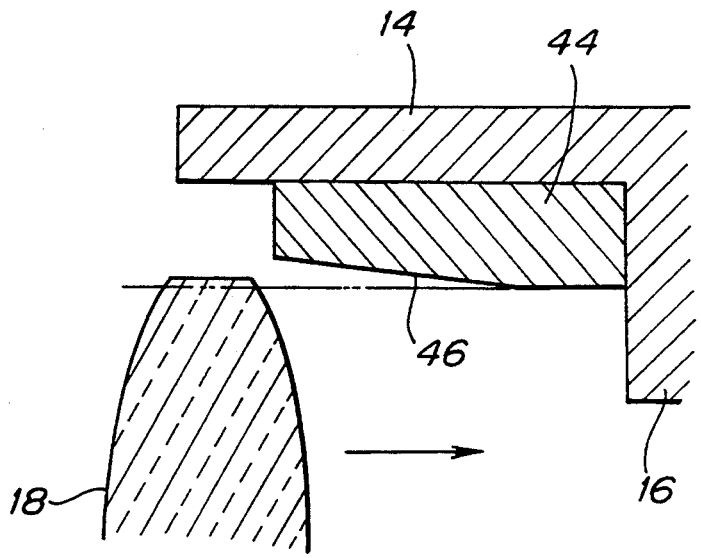
FIG. 3 is a fragmentary sectional view, on an enlarged scale, of the optical holder of FIG. 1 with an annular spacer.
Figure 4:
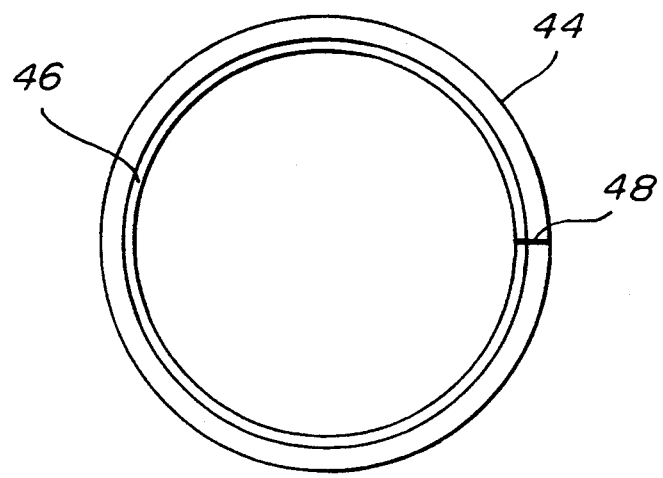
FIG. 4 is a front view of the annular spacer shown in FIG. 3.

FIG. 3 and 4 show a preferred form of the spacer for use in the optical holder of the present invention. The shape of this particular spacer is suitable when the lens is to be mounted after the spacer has been placed in the barrel. FIG. 3 is a fragmentary sectional view, on an enlarged scale, of the holding sturcture of FIG. 1, which includes an annular spacer 44, in lieu of the three arcuate spacers 38. Like reference numerals designate like elements in FIG. 1. As shown in FIG. 4, the spacer 44 is annular in shape and may have a cut 48. As shown in FIG. 3, the spacer 44 has an inclined or tapered surface 46 at its one or outer end, that gradually tapers radially inwardly from its outer end towards the inner end thereof. The thickness of the spacer 44 gradually increases from its outer end toward the inner end of the spacer 44. The lens 18 is inserted into the spacer 44 through its outer end and along tapered surface 46 of the spacer 44. The shape of the spacer 44 is particularly advantageous when the spacer is made of a compressible or resilient material that is greatly compressible upon insertion of the lens into the spacer. This design makes it possible to easily and rapidly insert the lens into the spacer.

With reference to FIG. 2, the spacers 38 are fit between the inner wall 15 and the lens 18 in a circumferentially equally spaced relationship. The spacers 38 are made of a resilient material. Upon insertion of the spacers 38 into the gap the spacers 38 are so compressed as to automatically align the lens 18 with respect to the inner wall 15 of the barrel 14. It is to be understood that the spacers may be uniformly distributed along the annular gap to obtain-the same results.

Figure 5:
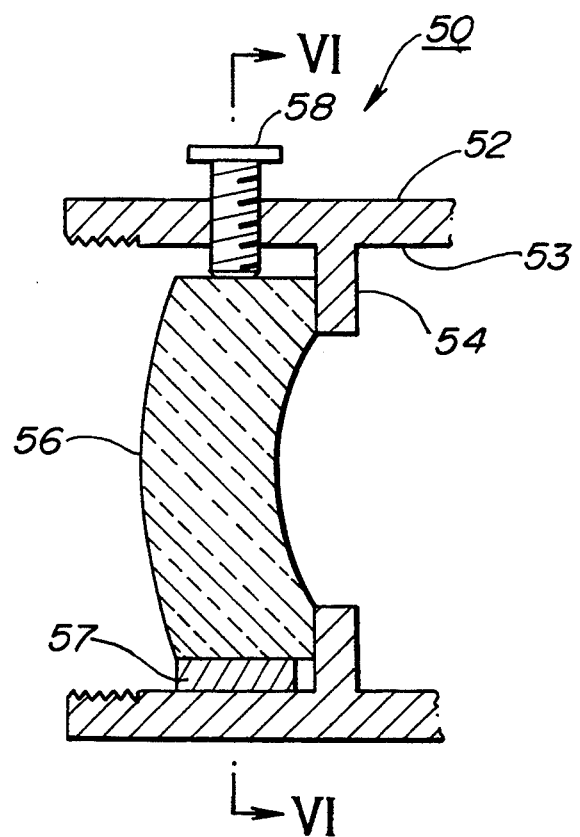
FIG. 5 is a sectional side view of an optical holder made according to another embodiment of the present invention.
Figure 6:
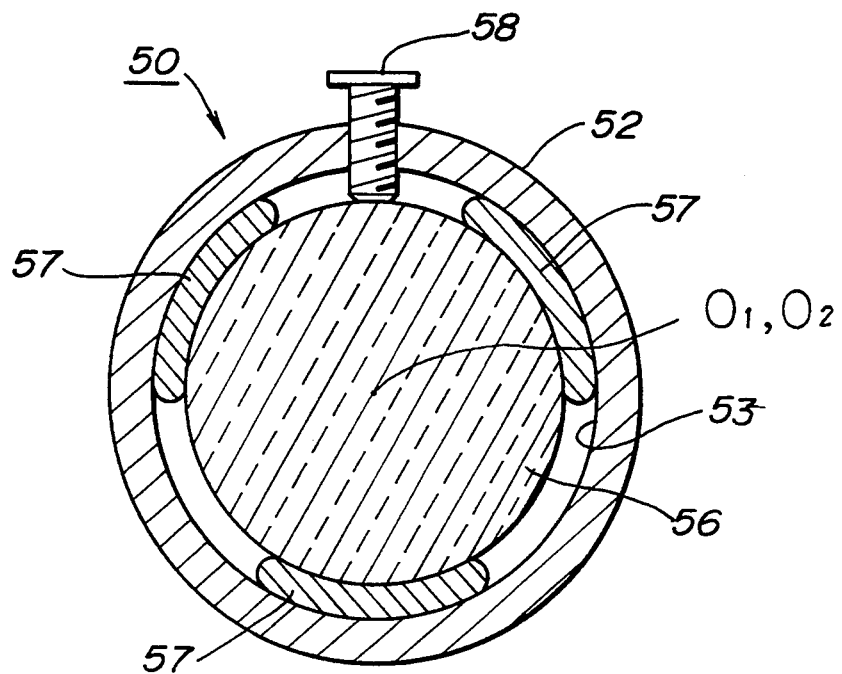
FIG. 6 is a sectional view taken along line VI—VI of FIG. 5.

FIGS. 5 and 6 show an optical holder made according to another embodiment of the present invention. As shown in FIG. 5, an optical holder 50 includes a generally cylindrical barrel 52. The barrel 52 defines a substantially cylindrical inner wall 53 and has an inner flange 54 with which a meniscus lens 56 is engaged. Three spacers 57, preferably made of a rubber-like or resilient material, are inserted between the inner wall 53 and the outer peripheral surface of the lens 56 at circumferentially equally spaced intervals. A shifting screw 58 extends through the barrel 52 between two adjacent spacers and terminates at the outer peripheral surface of the lens. 56. With this arrangement, a center $0_1$ of the lens 56 can be readily shifted with respect to a center $0_2$ of the inner wall 53 of the barrel 52 by driving the shifting screw 58 toward the lens 56.

In assembly, the lens 56 is placed within the barrel 52 with its one side engaged with the inner flange 54. The three spacers 57 are inserted into, or fitted between the inner wall 53 and the lens 56. The shifting screw 58 is then screwed toward the lens 56 to shift the position of the lens 56 within the inner wall 53 of the barrel 52.

Preferably, the thickness of each spacer is substantially equal to the nominal gap between the inner wall of the barrel and a lens to be mounted plus the maximum tolerances of the both components. Usually such a spacer is compressed to some extent to-thereby align the lens with respect to the inner wall of the barrel and also to prevent the lens from being offset from the inner wall even if a gap is formed between the inner wall of the spacer and the outer peripheral surface of the lens.

Spacer means may include a single annular element or a plurality of arcuate elements.

It should be understood that a mirror or other optical article, in lieu of the lens, may be mounted within the barrel.

Figure 7:
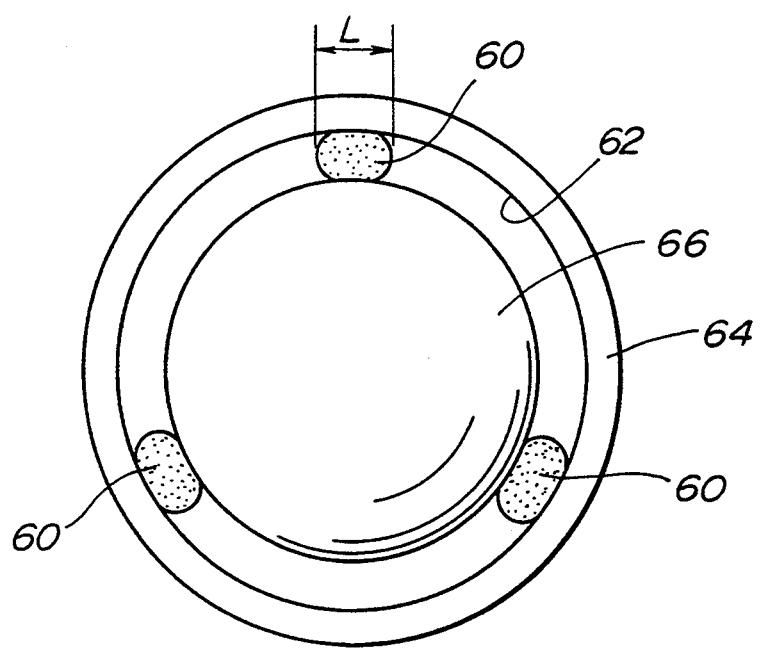
FIG. 7 is a view similar to FIG. 2, but showing a modified form of a spacer.

With reference to FIG. 7, there are shown three spacers 60 with a length L shorter that is than those shown in FIGS. 2 and 6. In the illustrated embodiment, the spacers 60 are thickened to provide a greater gap between an inner peripheral wall 62 of a barrel 64 and the outer peripheral surface of a lens 66. Normally, the inner wall is made of aluminum and has a glossy surface by means of skiving. Such a greater gap may prevent flare due to the inner peripheral wall 52.

Also, it should be understood that-the present invention is applicable to a collimater, a camera and other optical equipments.

It is to be understood that while numerous characteristics and advantages of the present invention have been set forth in the foregoing description, together with details of the structure and function of the invention, the disclosure is illustrative only, and changes may be made in detail, especially in the matter of shape, size, and arrangement of parts within the principles of the invention to the full extent indicated by the broad meaning of the terms in which the claims are expressed.

What is claimed is:

1. A structure for holding an optical article, comprising:

a holding frame for receiving an optical article, said holding frame comprising an inner peripheral wall having a circular shape, said optical article defined by an outer peripheral surface having a circular shape, said inner peripheral wall of said holding frame and said outer peripheral surface of said optical article being sized so as to provide a gap therebetween, wherein said inner peripheral wall is greater in diameter than said outer peripheral surface and said gap is formed in an annular shape, said structure further comprising spacer means which has a thickness corresponding to said gap, said spacer means comprising a plurality of arcuate members fitted against said holding frame and receiving said optical article in a circumferentially spaced relationship;

wherein said spacer means are compressible and are fit against said inner peripheral wall to hold said optical article in place, wherein said spacer means are capable of being fitted against said inner peripheral wall prior to fitting said optical article and wherein said spacer means provide a compressive force to hold said optical article, and wherein the structure further includes shifting means extending through said holding frame between two adjacent arcuate members and terminating at said outer peripheral surface.

2. A structure for holding an optical article according to claim 1, said shifting means comprising a shifting screw movable toward said optical article, wherein a center of said optical article is shifted with respect to a center of the said holding frame.

3. A structure for holding an optical article according to claim 1, further comprising annular projections extending from said inner peripheral wall for engaging said optical article.

4. An optical holder comprising:

means for defining a substantially cylindrical inner wall;

at least one circular optical article, an inner wall defined by said means for defining a substantially cylindrical inner wall being greater in diameter than said at least one optical article; and spacer means placed against said means for defining a substantially cylindrical inner wall for receiving said at least one optical article, said spacer means comprising a plurality of arcuate members fitted against said means for defining a substantially cylindrical inner wall and receiving said optical article in a circumferentially equally spaced relationship, said spacer means having a substantially uniform thickness and comprising a resilient material, so that said spacer means is compressed so as to fit between said inner wall and said at least one optical article, and wherein said spacer means provides a compressive force to hold said article, and wherein the optical holder further includes means for shifting said at least one optical article within said means for defining a substantially cylindrical inner wall, said shifting means extending through said means for defining a substantially cylindrical inner wall between two adjacent arcuate members and terminating at said at least one optical article.

5. A structure for holding an optical article according to claim 4, further comprising annular projections extending from said inner cylindrical wall for engaging said optical article.

* * * * *

UNITED STATES PATENT AND TRADEMARK OFFICE
CERTIFICATE OF CORRECTION

PATENT NO. : 5,396,487
DATED : March 7, 1995
INVENTOR(S) : T. ABE et al.

It is certified that error appears in the above-indentified patent and that said Letters Patent is hereby corrected as shown below:

On the title page, in section [56], "References Cited", "FOREIGN PATENT DOCUMENTS", line 11, change "8/1992" to --- 8/1982---.

Signed and Sealed this

Twenty-ninth Day of April, 1997

Attest:

BRUCE LEHMAN

Attesting Officer   Commissioner of Patents and Trademarks